July 13, 1937.                L. RUTAN                2,087,046
                    SANITARY COVER FOR RECEPTACLES
                         Filed July 11, 1936
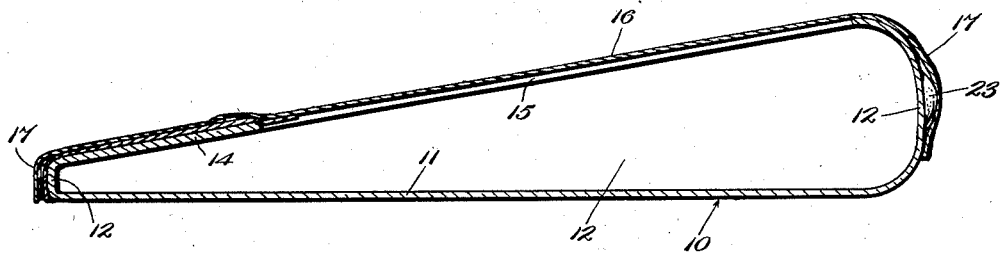
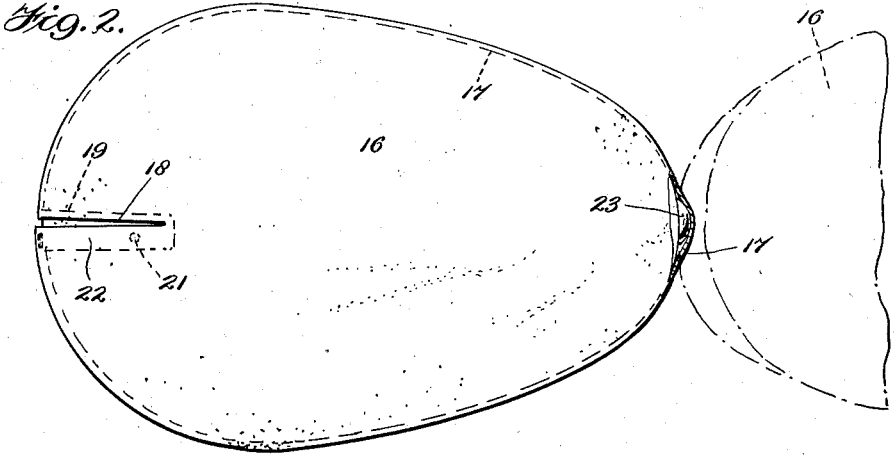
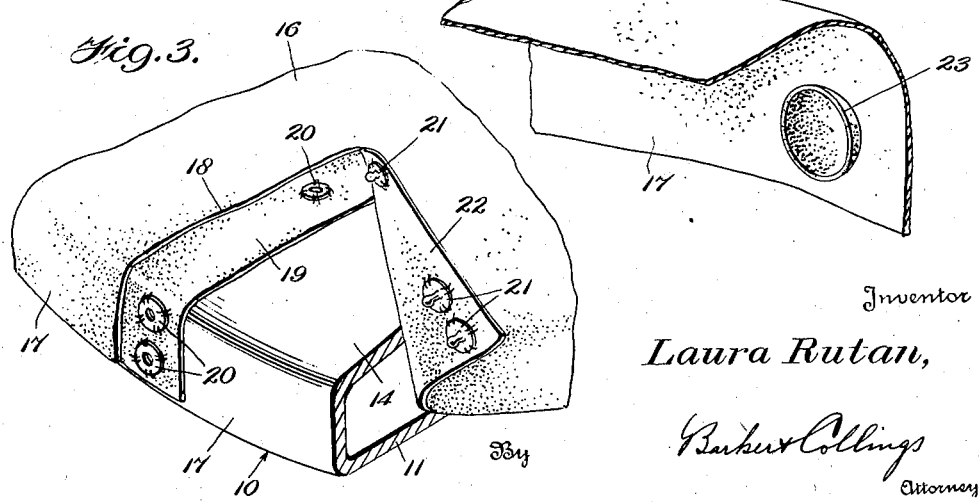
Inventor
Laura Rutan,

Patented July 13, 1937

2,087,046

UNITED STATES PATENT OFFICE 2,087,046

SANITARY COVER FOR RECEPTACLES

Laura Rutan, Washington, D. C.

Application July 11, 1936, Serial No. 90,220

2 Claims. (Cl. 4—112)

My invention relates to receptacle covers, and more especially to sanitary covers for bed pans, and has for one of its objects to provide a flexible or resilient cover for such receptacles which may be readily applied thereto and removed therefrom, and which when in place will effectively seal the receptacle until its contents are to be disposed of.

A further object of the invention is to provide a cover of flexible or resilient sanitary material which is shaped to conform substantially to and engage with the walls of the bed pan, closing the opening thereof.

A still further object of the invention is to provide a cupped resilient cover member, the walls of which are adapted to frictionally engage the walls of the pan, and which is preferably provided with a suction cup device for detachably attaching the cover to the pan; the said cover also being preferably slit on one point in perimeter and provided with readily engageable and disengageable fastening devices, to facilitate its application and removal.

With the above and other objects in view which will appear as the description proceeds, the invention consists in the novel details of construction, and combinations and arrangements of parts more fully hereinafter disclosed, and particularly pointed out in the appended claims.

Referring to the accompanying drawing forming a part of this specification, in which like reference characters designate like parts in all the views:—

Figure 1 is a longitudinal sectional view through a bed pan equipped with a sanitary cover in accordance with my invention;

Fig. 2 is a plan view of the parts shown in Fig. 1;

Fig. 3 is a fragmentary perspective view, showing the slit and associated fastening devices; and Fig. 4 is a similar view, showing the attaching suction cup.

In the said drawing, 10 indicates the bed pan, having the bottom wall 11, side and end walls 12, and top wall 14, the latter of which is provided with the opening 15. The cover 16, which is preferably of rubber, rubberized fabric, or other similar sanitary flexible or resilient material, is cupped or dished to provide the perimetral flange or wall 17, adapted to embrace and frictionally engage with the outer surface of the pan walls 12. At one point in its periphery, the cover is slit, as indicated at 18, and a piece 19 of the material is vulcanized or otherwise secured to the inner surface of the cover to underlie the slit.

The said piece 19 has secured to it a plurality of socket members 20, constituting one element of readily engageable and disengageable snap fasteners, the complementary elements 21 of which are secured to the flap portion 22 of the cover.

At another point in its periphery, the wall 17 has secured to it a rubber or other suitable suction cup 23, which as is clearly shown in Figs. 1 and 2, serves to readily detachably secure the cover to the pan. The suction cup 23 is preferably disposed at a point opposite to the slit 19.

The mode of use will be readily apparent from the foregoing description, it being understood that the cover is attached to the pan at one point by the suction cup 23, the cover occupying the position indicated in broken lines in Fig. 2 when the pan is to be used. After use, the cover is drawn to the left, as viewed in Fig. 2, to bring it to the full line position illustrated therein, closing the pan opening 15, and with its flange or wall 17 engaging the outer surface of the pan wall 12. In fastening the flap 22 by engagement of the snap fastener elements 20 and 21, the material of the cover is tensioned to cause intimate frictional engagement of the flange 17 with the pan wall 14, thereby effectively sealing the pan against escape of its contents until it is desired to dispose of the latter.

The cover of course may be readily detached from the pan at any time for washing, sterilization, etc., whereby it may be maintained in sanitary condition.

While one form of the invention has been illustrated and described it is obvious that those skilled in the art may vary the details of construction as well as the precise arrangement of parts without departing from the spirit of the invention and therefore it is not wished to be limited to the above disclosure except as may be required by the claims.

I claim:

1. A cover for bed pans comprising a flexible rubber-like sheet adapted to be positioned to close the pan opening, and having an integral angularly disposed perimetral portion arranged to intimately engage the outer surfaces of the pan walls, said perimetral portion also being slit at one point and provided with readily engageable and disengageable fastening means, to facilitate application and removal of the cover to the pan said fastening means maintaining the slit closed when the cover is in operative position.

2. A cover for bed pans comprising a flexible non-metallic sheet adapted to be positioned to close the pan opening, and having an integral angularly disposed perimetral flange portion arranged to intimately engage the pan walls, said perimetral portion being slit at one point and provided with a slit-bridging member secured to the sheet along one side of the slit and carrying elements of snap fastening devices, the complemental elements thereof being carried by the perimetral portion adjacent the slit and arranged to engage said first named elements to maintain the slit closed when the cover is in operative position.

LAURA RUTAN.